US012563111B2

(12) United States Patent
Ittelson et al.

(10) Patent No.: US 12,563,111 B2
(45) Date of Patent: Feb. 24, 2026

(54) APPLICATION ACCESS SIGNAL FOR VIDEOCONFERENCES

(71) Applicant: Zoom Video Communications, Inc., San Jose, CA (US)

(72) Inventors: Brendan Ittelson, San Jose, CA (US); Robert Mews, San Jose, CA (US); Yoshifumi Takebuchi, San Jose, CA (US)

(73) Assignee: Zoom Communications, Inc., San Jose, CA (US)

( * ) Notice: Subject to any disclaimer, the term of this patent is extended or adjusted under 35 U.S.C. 154(b) by 71 days.

(21) Appl. No.: 18/242,604

(22) Filed: Sep. 6, 2023

(65) Prior Publication Data

US 2025/0080592 A1      Mar. 6, 2025

Related U.S. Application Data

(63) Continuation of application No. 17/329,713, filed on May 25, 2021, now Pat. No. 11,785,181.

(51) Int. Cl.
H04L 65/402      (2022.01)
H04L 65/1069      (2022.01)

(52) U.S. Cl.
CPC ........ H04L 65/402 (2022.05); H04L 65/1069 (2013.01)

(58) Field of Classification Search
CPC .. H04L 65/402; H04L 65/403; H04L 65/1069
USPC ........................................................ 709/204
See application file for complete search history.

(56) References Cited

U.S. PATENT DOCUMENTS

| | | | |
|---|---|---|---|
| 11,785,181 B2 | 10/2023 | Ittelson et al. | |
| 2004/0162773 A1 | 8/2004 | Del Rey et al. | |
| 2009/0164583 A1* | 6/2009 | Zhu .................... | H04L 67/1063 |
| | | | 709/205 |
| 2020/0288085 A1 | 9/2020 | Yang et al. | |
| 2020/0293261 A1* | 9/2020 | Janamanchi ........ | H04L 12/1831 |
| 2020/0293493 A1* | 9/2020 | Janamanchi ........ | H04L 65/1069 |
| 2021/0126983 A1* | 4/2021 | Bellet .................. | G06F 3/0482 |

(Continued)

FOREIGN PATENT DOCUMENTS

JP      2005258495 A      9/2005

OTHER PUBLICATIONS

U.S. Appl. No. 17/329,713, "Advisory Action", dated Sep. 21, 2022, 3 pages.

(Continued)

*Primary Examiner* — Glenford J Madamba
(74) *Attorney, Agent, or Firm* — Kilpatrick Townsend & Stockton LLP

(57)      ABSTRACT

Example methods and systems provide a participant attending a videoconference with a user interface indicator that signals access to personal information. More particularly, the indicator can signal that a companion application being used by attendees of the videoconference is accessing or has accessed videoconference meeting data that includes the personal information. In some examples, the participant can subsequently interact with the user interface to obtain additional information about the companion application. For example, the participant may be able to display user identifiers of the attendees using the companion application and/or a description of the companion application.

14 Claims, 9 Drawing Sheets

(56) References Cited

U.S. PATENT DOCUMENTS

| 2022/0060661 | A1* | 2/2022 | Truong | H04W 12/02 |
| 2022/0116432 | A1* | 4/2022 | Mayfield | H04L 65/1059 |

OTHER PUBLICATIONS

U.S. Appl. No. 17/329,713, "Final Office Action", dated May 11, 2023, 11 pages.

U.S. Appl. No. 17/329,713, "Final Office Action", dated Jun. 20, 2022, 8 pages.

U.S. Appl. No. 17/329,713, "Non-Final Office Action", dated Dec. 9, 2021, 8 pages.

U.S. Appl. No. 17/329,713, "Non-Final Office Action", dated Feb. 2, 2023, 9 pages.

U.S. Appl. No. 17/329,713, "Notice of Allowance", dated Jul. 31, 2023, 6 pages.

PCT/US2022/027758 , "International Preliminary Report on Patentability", Dec. 7, 2023, 8 pages.

PCT/US2022/027758 , "International Search Report and Written Opinion", Jul. 21, 2022, 11 pages.

* cited by examiner

700

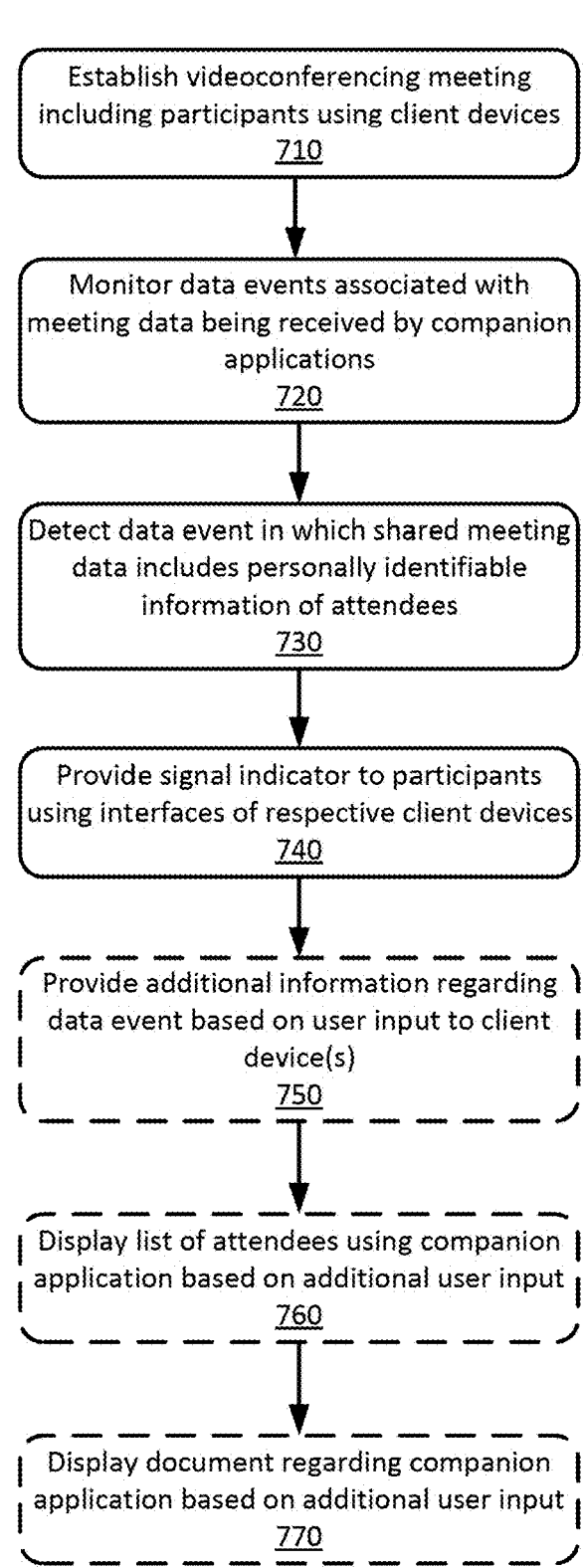

Establish videoconferencing meeting including participants using client devices
710

Monitor data events associated with meeting data being received by companion applications
720

Detect data event in which shared meeting data includes personally identifiable information of attendees
730

Provide signal indicator to participants using interfaces of respective client devices
740

Provide additional information regarding data event based on user input to client device(s)
750

Display list of attendees using companion application based on additional user input
760

Display document regarding companion application based on additional user input
770

*FIG. 7*

APPLICATION ACCESS SIGNAL FOR VIDEOCONFERENCES

CROSS-REFERENCE TO RELATED APPLICATION

This application is a continuation of and claims priority to U.S. patent application Ser. No. 17/329,713, entitled "APPLICATION ACCESS SIGNAL FOR VIDEOCON-FERENCES," filed on May 25, 2021, the entirety of which is incorporated by reference herein.

FIELD

The present application generally relates to videoconferences and more particularly relates to systems and methods for signaling videoconference participants if and when an application other than the videoconferencing application accesses certain information.

BACKGROUND

Videoconferencing has become a common way for people to meet as a group, but without being at the same physical location. Participants can be invited to a videoconference meeting, join from their personal computers or telephones, and are able to see and hear each other and converse largely as they would during an in-person group meeting or event. The advent of user-friendly videoconferencing software has enabled teams to work collaboratively despite being dispersed around the country or the world. It has also enabled families and friends to engage with each other in more meaningful ways, despite being physically distant from each other.

SUMMARY

Various examples are described for systems and methods for providing a user interface signal that can indicate that one or more auxiliary or companion applications is accessing or has accessed information about the attendees that is available as a result of participation in a videoconference. One example system includes a processor and at least one memory device including instructions that are executable by the processor. The instructions can cause the processor to establish a videoconferencing meeting including a number of attendees attending the videoconferencing meeting using client devices. The instructions can further cause the processor to monitor data events associated with meeting data being received by a companion application associated with a client device. The instructions can further cause the processor to detect a data event from among the data events in which the meeting data includes personally identifiable information about an attendee, and cause the processor to signal a participant, using an interface of a client device associated with the participant, that the companion application is receiving or has received the personally identifiable information.

One example method includes establishing a videoconferencing meeting including a number of attendees attending the videoconferencing meeting using client devices. The method further includes monitoring data events associated with meeting data being received by a companion application associated with a client device. The method further includes detecting a data event from among the data events in which the meeting data includes personally identifiable information about at least one attendee, and signaling a participant, using an interface of a client device that the companion application is receiving or has received the personally identifiable information.

One example non-transitory computer-readable medium includes code that is executable by a processor for causing the processor to provide a user interface signal that can indicate that one or more auxiliary or companion applications is accessing or has accessed information about the attendees that is available as a result of participation in the videoconference. The code can cause the processor to establish a videoconferencing meeting including a number of attendees attending the videoconferencing meeting using client devices. The code can further cause the processor to monitor data events associated with meeting data being received by a companion application associated with a client device. The code can further cause the processor to detect a data event from among the data events in which the meeting data includes personally identifiable information about an attendee, and cause the processor to signal a participant, using an interface of a client device associated with the participant, that the companion application is receiving or has received the personally identifiable information.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 7 illustrates an example method for providing a user interface signal to indicate that a companion application is accessing or has accessed information about the attendees.

DETAILED DESCRIPTION

Figure 1:
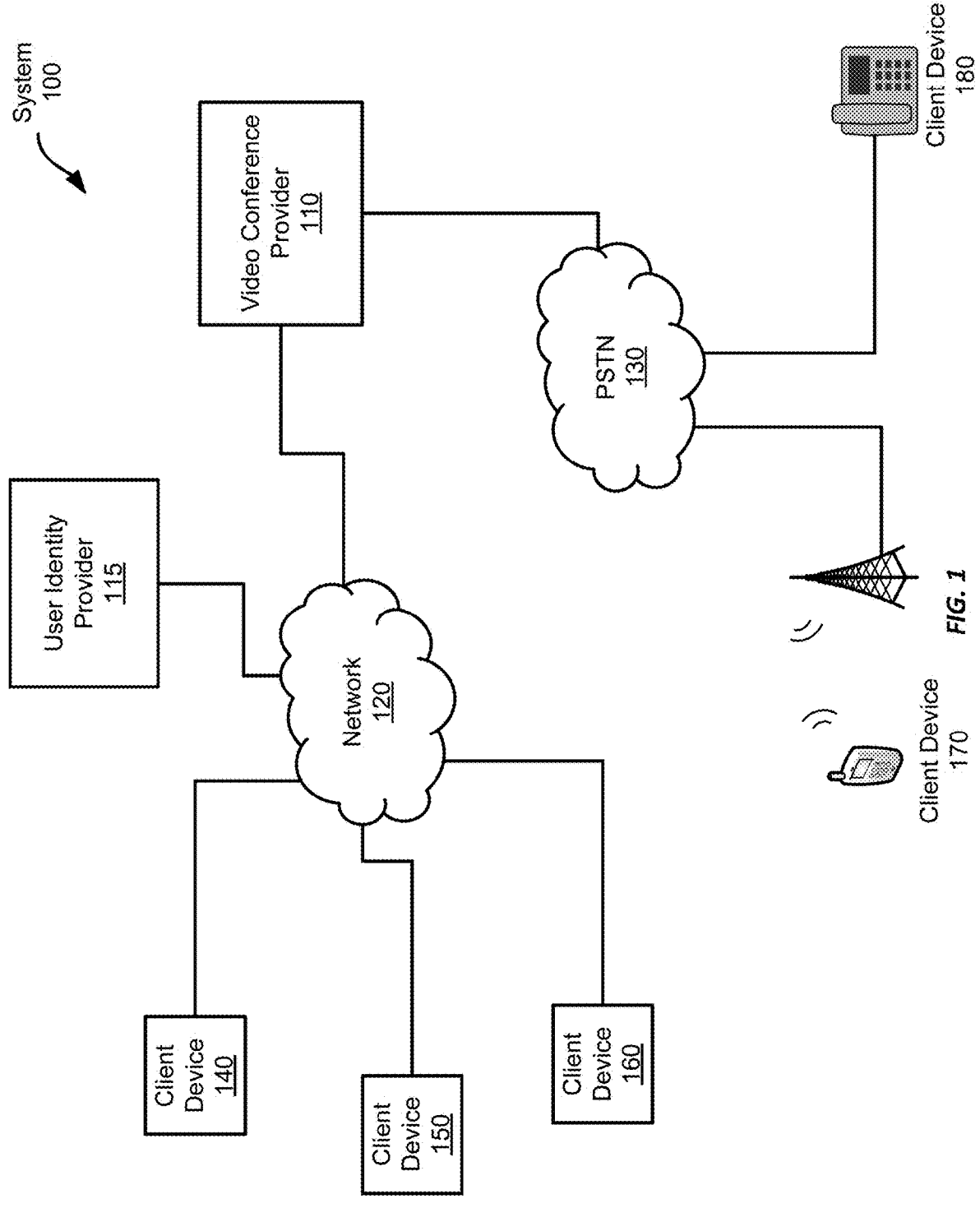
FIGS. 1 and 2 illustrate example systems to enable a user interface signal to indicate that a companion application is accessing or has accessed information about attendees.

Examples are described herein in the context of systems and methods for providing a user-interface signal to a participant in a videoconference regarding auxiliary or companion applications accessing personal information about attendees participating in the videoconference. This information, as an example, can include personally identifiable information ("PII") about attendees. The term "personal information," as used herein, may include PII as defined by various laws, as well as similar or additional information or data that a typical user might consider personal, such that the user would want to limit the distribution of such information. Examples of personal information include, but are not limited to, biometric data, birth dates, addresses, Email addresses, government identification numbers, financial account numbers, gender, ethnicity, telephone numbers, IP addresses, device identification numbers, and photographs. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Videoconferencing systems enable their users to create and attend videoconferences (or "meetings") via various types of client devices. After joining a meeting, the participants receive audio and video streams or feeds (or "multimedia" streams or feeds) from the other participants and are presented with views of the video feeds from one or more of the other participants and audio from the audio feeds. Using these different modalities, the participants can see and hear each other, engage more deeply, and generally have a richer experience despite not being physically in the same space.

To create a meeting, a person (referred to as the "host" or "meeting host") accesses the videoconferencing system, schedules a new meeting, and identifies one or more other people to invite to the meeting. In response to the host creating the meeting, the videoconference system establishes the meeting by creating a meeting identifier and, if desired, a passcode or other access control information. The host can then send the meeting identifier (and access control information) to each of the invitees, such as by email. Once the meeting is started, the invitees can then access and join the meeting using the meeting identifier and any provided access control information. The initial, or main host can, in some systems, make another participant a co-host. For purposes of the discussion herein, the term "host" encompasses hosts and co-hosts. Hosts can manage and control the videoconferencing session.

Some videoconferencing platforms provide the necessary software interfaces to allow the videoconferencing client application to interact with auxiliary or companion applications, which may be running on a client device. A companion application can run solely on the client device, or be a cloud-based or partially cloud-based application that the client device is accessing. Regardless of whether the application is running on a client device or elsewhere, for purposes of this discussion, it can be considered "associated with" a client device. A companion application may provide, as examples, collaboration features, time management, or access to social media platforms. Such an application may access information about a videoconference, and the that information may include PII of conference attendees who may be unaware that another attendee is making use of the companion application.

To provide more information to participants in videoconferences regarding use of their personal information, a videoconferencing system according to this disclosure can provide a signal to a participant through a user interface of a client device to indicate that a companion application being used by one or more attendees is accessing, or has accessed, personal information about other attendees, including the participant using the client device. In some examples, a participant can then mouse-over, click, or otherwise interact with the user interface on the client device to obtain additional information.

A videoconferencing system according to some examples can establish a videoconferencing meeting, with each attendee accessing the videoconferencing meeting using a client device. The system can monitor data events associated with meeting data being received by companion applications. The system can detect a data event in which meeting data including personal information about attendees is being accessed by a companion application, and signal each participant through a user interface. In some examples, a participant can interact with the interface to obtain additional information about the attendees using the companion application and/or a description of the companion application.

The techniques disclosed herein for providing an application access signal for participants in a videoconference enable users of videoconferencing clients to receive notice when their information may be accessed by another application. This notice enables users to stay informed about use of their information that might not otherwise be known.

This illustrative example is given to introduce the reader to the general subject matter discussed herein and the disclosure is not limited to this example. The following sections describe various additional non-limiting examples and examples of systems and methods for providing a user interface signal to indicate that a companion application is accessing or has accessed information about attendees of a videoconference.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the Internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
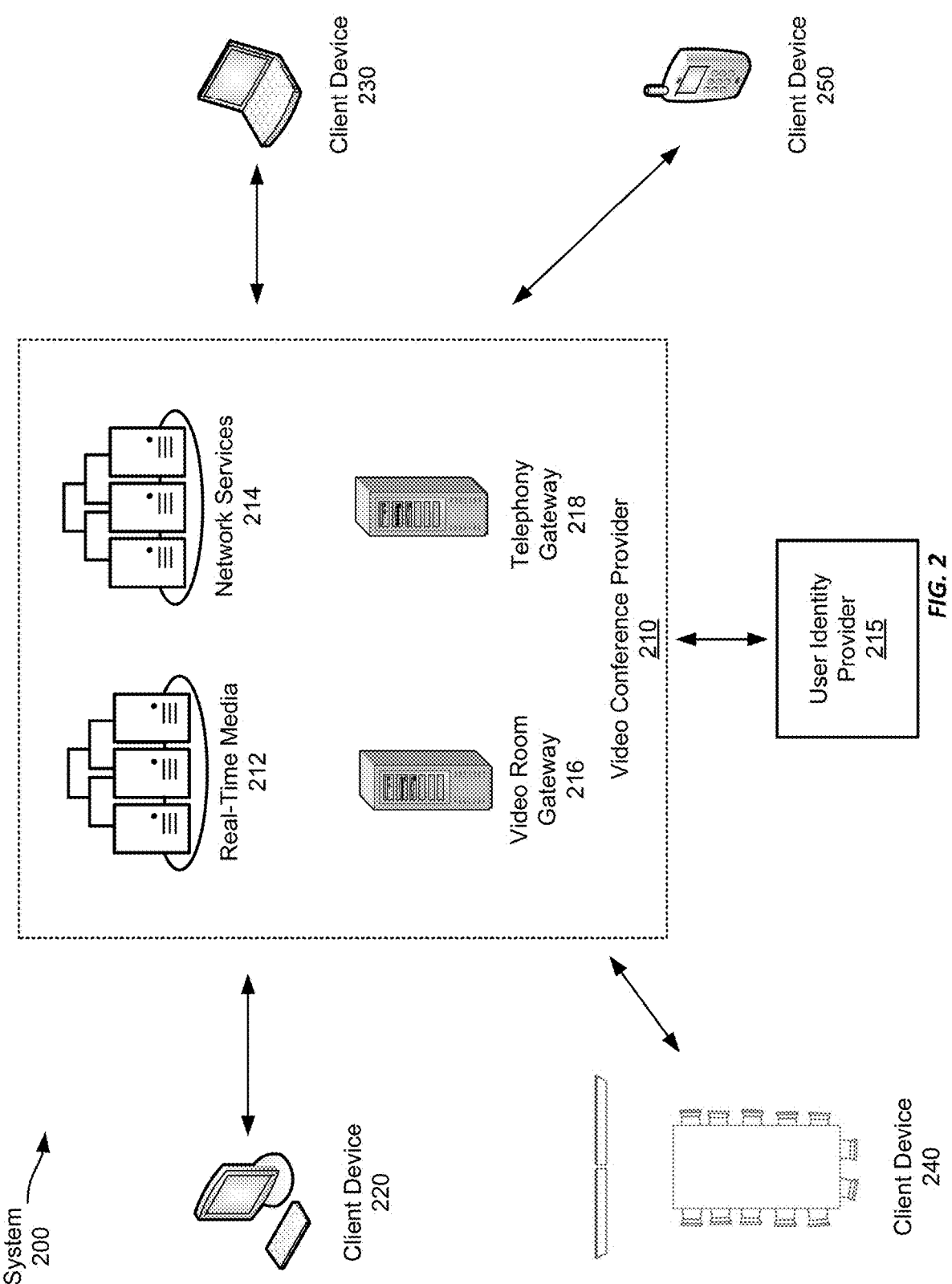

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateway servers 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

As discussed above, multimedia streams may be encrypted between the client devices 220-250 and the video conference provider 210. In some such examples, the real-time media servers 212 may multiplex the multimedia streams appropriately for the various clients.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference provider 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
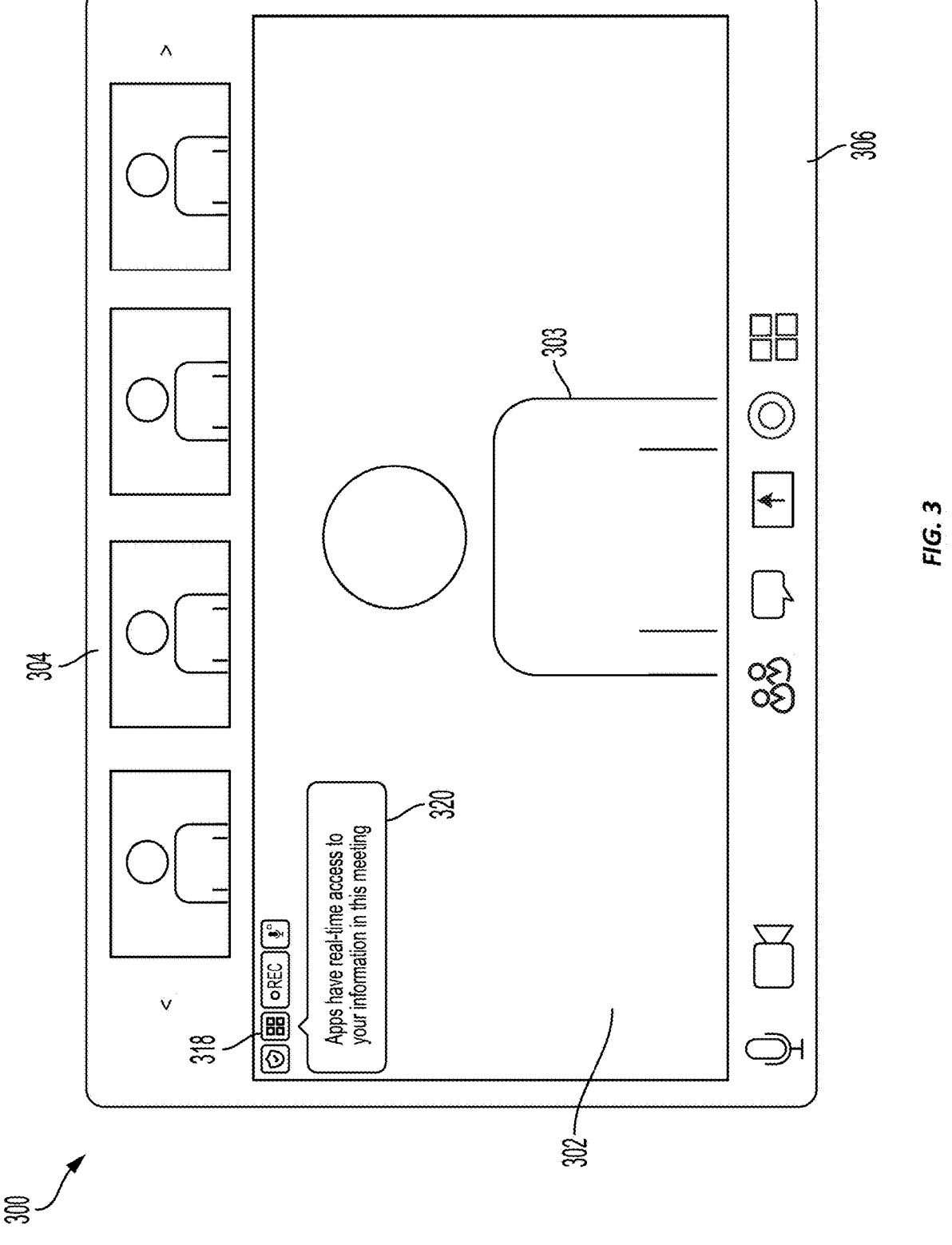
FIGS. 3 and 4 illustrate example screenshots of a user interface that provides a signal to indicate that a companion application is accessing or has accessed information about attendees.
Figure 4:
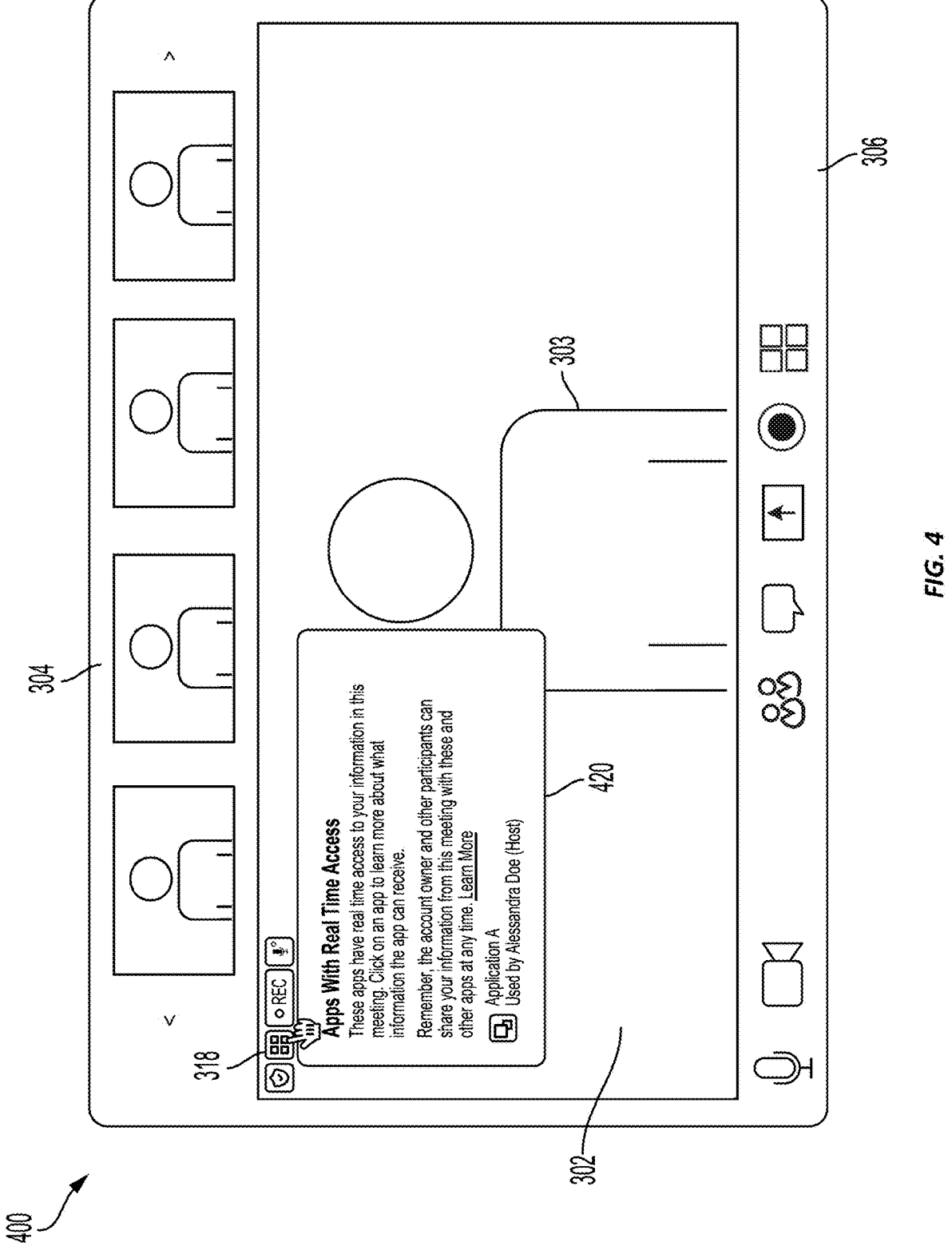

FIGS. 3 and 4 illustrate example graphical user interfaces that provide a signal to indicate that a companion application is accessing or has accessed personal information about attendees of a videoconference. These graphical user interfaces can be displayed, as examples, on client devices 140-170 of FIG. 1 or client devices 220, 230, or 250 of FIG. 2. In some examples, a companion application can be an application running on the client device along with the videoconferencing client, or a cloud-based application that the client device is accessing. In other examples, a companion application may not be accessed by the client device. A companion application may provide, as examples, collaboration features for workplace teams, personal information management, time recordation, or access to social media platforms. A companion application as contemplated by the examples described herein may include features to access an API and/or data streaming events of other applications such as the videoconferencing application. Alternatively, or in addition, the videoconferencing application may include features to access an API and/or data streaming events of other applications such as the companion application. The companion application uses these features to provide functionality in conjunction with the videoconferencing application.

For example, an attendee may be able to schedule a videoconferencing meeting through the companion application. As an example, an attendee may be able to schedule a videoconferencing meeting through a calendar function of a personal information manager such as Microsoft's Outlook®. As another example, companion applications that provide collaboration features may gather information to inform an attendee that colleagues are participating in a videoconference. In the descriptions below, the term "attendee" generally refers to any user attending a given videoconference, whereas the term "participant" generally refers to a person using a specific client device to interact with the features described.

Referring now to FIG. 3, FIG. 3 illustrates an example graphical user interface (GUI) 300 that is providing a signal to a participant to indicate that a companion application is accessing or has accessed personal information about attendees. User interface 300 includes a main viewing area 302. Main viewing area 302 may display various images, depending on the configuration of the GUI chosen by the videoconference participant. In this example, main viewing area 302 is displaying an image 303 of the current or active speaker in the videoconference. User interface 300 also includes a gallery strip 304. Gallery strip 304 displays thumbnail images of the most recent speakers in the videoconference. User interface 300 also includes a toolbar 306. Toolbar 306 includes various user controls, as examples, controls for video devices, microphones, chat functions, gesture functions, and recording functions.

GUI 300 includes an indicator icon 318 that signals the participant using the client device that a companion application is accessing or has accessed personal information about attendees of the meeting. In the example of FIG. 3, indicator icon 318 is part of a small panel of icons that provide additional or alternative control functions for the videoconferencing meeting. In some examples, the indicator icon is not shown until the access occurs. In other examples, the icon is a fixed part of the interface, but is "grayed out" when no such access has occurred, and "lights up" or changes color to signal the participant about access to the participant's personal information. GUI 300 also includes an information banner 320 that explains the nature of the indicator icon 318 and/or its observed changes. In some examples, information banner 320 pops up for a certain amount of time when indicator icon 318 is activated. In other examples, information banner 320 is displayed as long as the icon is active, or until the user clears the banner by pressing a key, clicking the banner, or "clicking away." In other examples, the participant can instead, or in addition, "mouse over" indicator icon 318 and cause information banner 320 to be displayed.

Referring now to FIG. 4, FIG. 4 illustrates an example graphical user interface 400 that is providing a signal to indicate that a companion application is accessing or has accessed personal information about attendees. Graphical user interface 400 illustrates the state of the user interface assuming that information banner 320 of graphical user interface 300 of FIG. 3 displays momentarily or continuously when indicator icon 318 is activated. In user interface 400, the participant either mouses-over or clicks icon 318 and a more detailed information banner 420 is displayed. Information banner 420 provides more detailed information on access to attendee information. Information banner 420 provides, as example, a list of the application or applications involved in the data event or data events. In this example, Application A has real time access to the attendees' personal information. In this example, information banner 420 also provides information about other meeting participants using Application A. More specifically, information banner 420 states that Alessandra Doe is using Application A. In some examples, an information banner may provide only an indication of how many other participants are using the application. Such an indication may be all that is available, or alternatively, the user may be able to provide further input to obtain further information.

Figure 5:
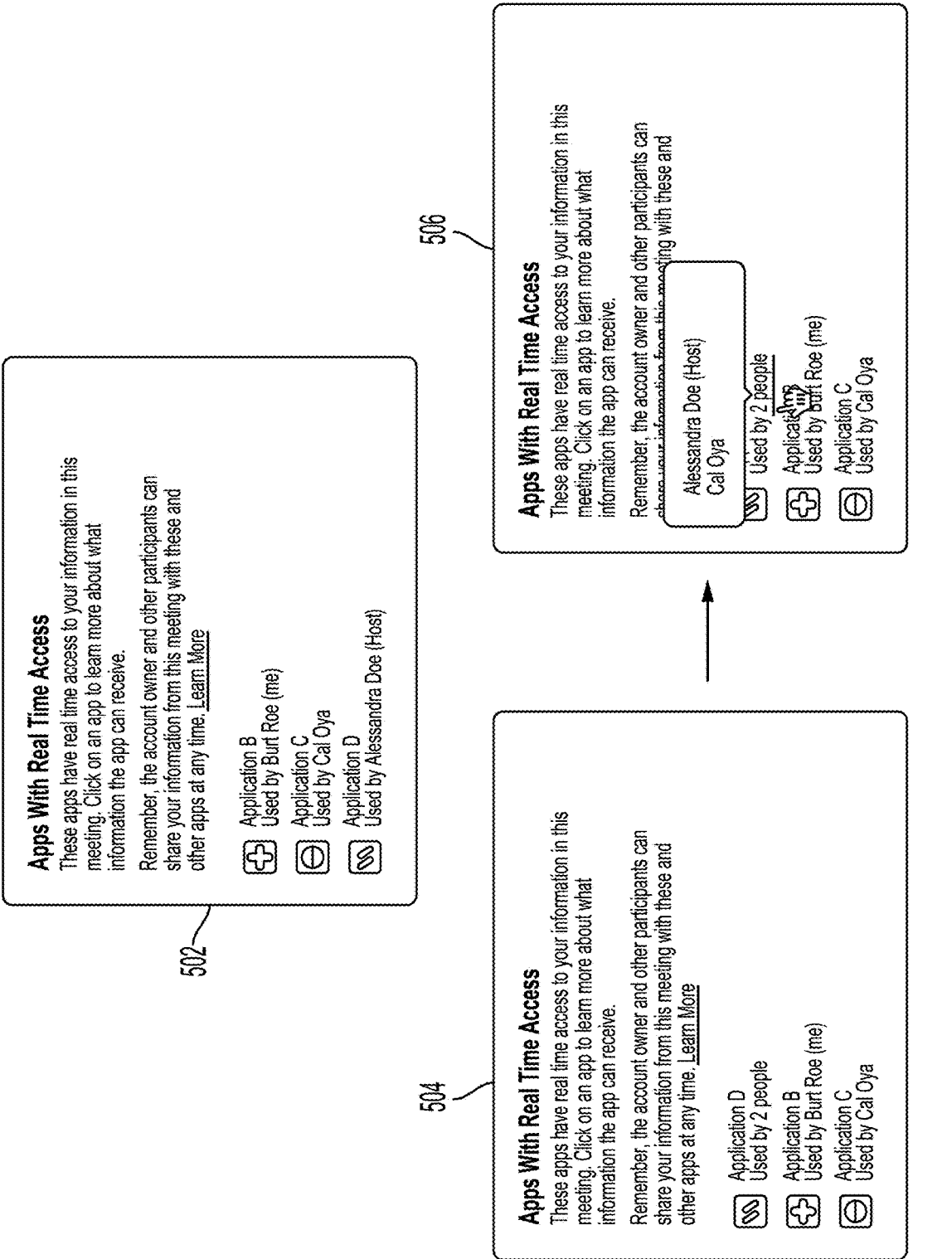
FIG. 5 illustrates example, optional details for an information banner shown in FIG. 4.

Referring now to FIG. 5, FIG. 5 illustrates example details for an information banner like information banner 420 of FIG. 4. Information banner 502 of FIG. 5 is an example of an information banner that displays multiple applications and information about participants using the applications. As shown in information banner 502, Application B is being used by Bert Roe, Application C is being used by Cal Oya, and Application D is being used by Alessandra Doe. In some examples, a participant can click on the icon for a companion application and an informational document for the application can be displayed. For example, the icon can include a link to the application's public Web page, or to the application's listing in an "app store" or "app marketplace" for applications that can be used with the videoconferencing client application.

Information banners 504 and 506 of FIG. 5 illustrate ways in which the GUI can handle companion applications with multiple users without excessive information clutter. Information banner 504 shows that Application B is being used by two other participants, "2 people." In some examples, the number of persons using an application is all that is provided to the participant. In this example, the participant can mouse over the phrase stating the number of people using the application and information banner 506 results. Information banner 506 includes overlaid text, which lists the attendees using the relevant application. A user interface indicator can be provided to a user of a client device in additional or alternative ways. For example, a client device can emit a light, a beep, etc. A small display on a digital telephony device can also provide an indicator. As another example, a variety of privacy indicators can be provided on a device or devices in a video room through video room gateway servers 216 of system 200.

Figure 6:
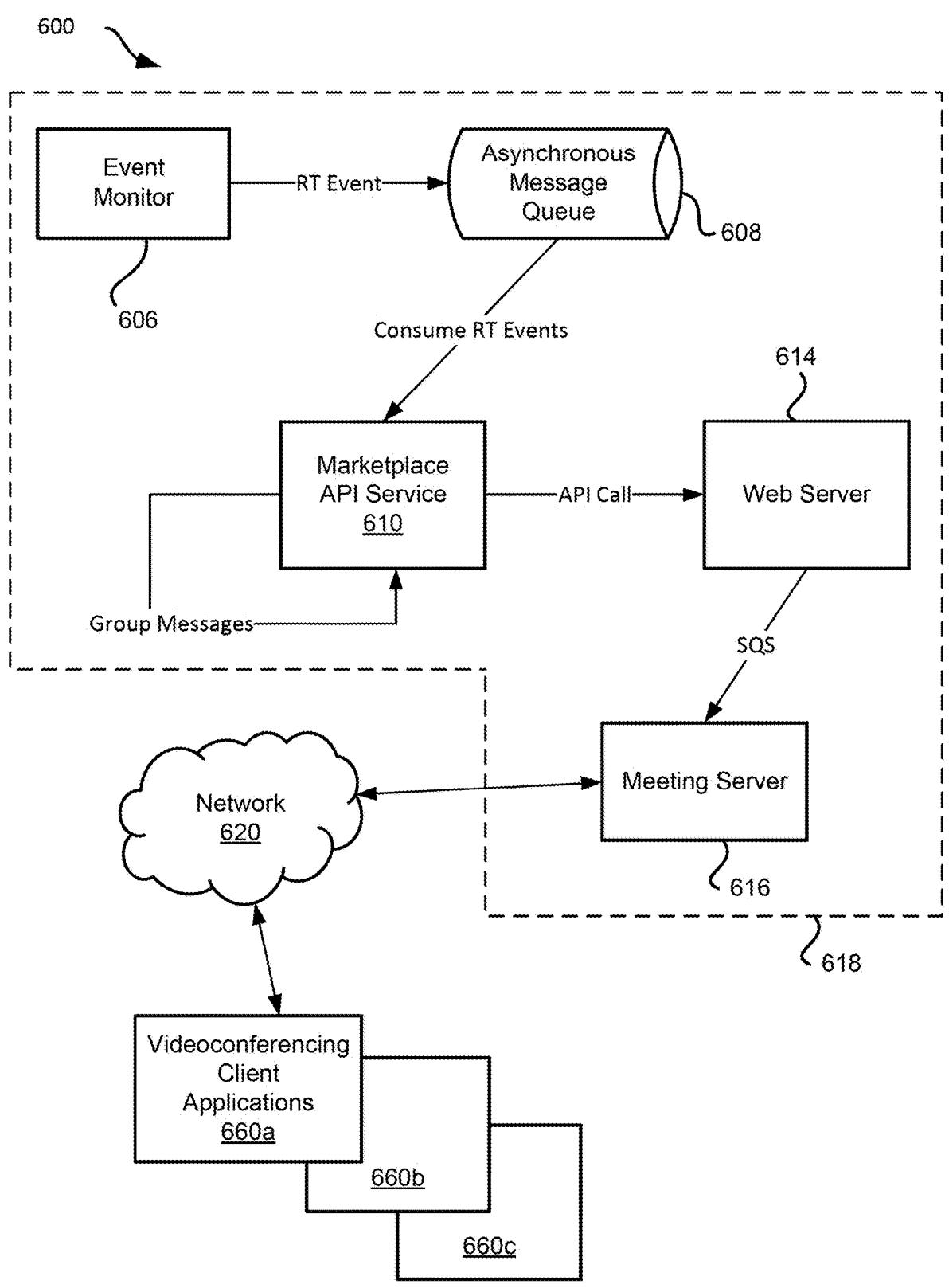
FIG. 6 illustrates an additional example system to enable a user interface signal to indicate that a companion application is accessing or has accessed information about attendees.

FIG. 6 illustrates an additional example system to enable a user interface signal to indicate that a companion application is accessing or has accessed information about attendees. More specifically, system 600 illustrates signaling and entities used in providing the interface signals shown and discussed with respect to FIGS. 3-5. It should be noted that, while a companion application will often be an application provided by a third party relative to the attendees and the video conference provider, the methods and systems herein may also be applied to companion applications supplied by the video conference provider itself, as well as to applications supplied by a videoconference host or co-host. In this example, entities within boundary 618 run in or on the video conference provider's servers. These entities may be combined and arranged in various ways to provide the same collective function. The videoconferencing functions provided within boundary 602 may be provided by a single entity or many entities. Event monitor 606 receives real time (RT) events from companion applications. In some examples, event monitor 606 receives these events from client devices, based on videoconferencing client API and/or data streaming event messaging, as the video conference provider will have provided for this messaging in a software development kit ("SDK") provided to companion application providers. In other examples, these events are received through a logging service for the companion application or the companion application's Web page. For each event that may indicate personal information is being accessed or consumed by the relevant application, event consumer 606 generates an RT event message and sends the message to asynchronous message queue 608. Asynchronous message queue 608 can decouple the event monitor 606 from other entities from a timing perspective so that the event monitor 606 can operate independently. Asynchronous message queue 608 in some examples may also provide load-balancing.

An API service 610 for an application marketplace handles the signaling to the video conference provider's Web system. The API service 610 consumes RT events, which contain the companion application information and the videoconferencing meeting host information. This information can be used to determine which attendees are using the companion application of concern. For some events, for example, events connected with companion application users joining the videoconference, the event or a closely related event may happen several times during a relatively short period. In such cases, the API service 610 will internally cache the events and group messages regarding the events together.

The API service 610 sends API requests to generate the user interface signal indicating personal information access to Web server 614, which in this example is a Web server in the video conference provider's system. Web server 614 provides attendee account information and meeting setup services to users of the video conference provider's service. Web server 614 in this example forwards messages regarding the user interface signal to meeting server 616 using simple queue service (SQS) messaging. In some examples, these messages can be handled by another asynchronous message queue between the Web server and the meeting server.

Meeting server 616 broadcasts signaling messages through network 620 for activating indicator icons at all relevant videoconferencing client applications, such as client applications 660*a-c*. Applications 660*a-c*, as an example, may be running on client devices such as client devices 140-170 of FIG. 1 or client devices 220, 230, or 250 of FIG. 2. Meeting server 616 may also be referred to as a multimedia router and can be implemented by the real-time media servers 212 working with the network services servers 214. The meeting server maintains stored representations of the virtual meetings taking place in the system so that the meeting server can keep track of the status of videoconferences without constantly exchanging this information with client devices.

Referring now to the method 700 illustrated in FIG. 7, FIG. 7 shows an example method 700 for providing a user interface signal to indicate that a companion application is accessing or has accessed information about the attendees of a videoconference. The description of the method 700 in FIG. 7 will be made with reference to the graphic user interfaces shown in FIGS. 4 and 5, and also with respect to the system of FIG. 6. However, a graphical user interface of any suitable design may be used. Also, any suitable system according to this disclosure may be used, such as the example systems 100 and 200 shown in FIGS. 1 and 2.

At block 710, a processor at the video conference provider, for example, the processor running Web server 614 and/or the processor running meeting server 616, establishes a videoconferencing meeting including attendees using client devices. At block 720, the event monitor 606 monitors data events associated with meeting data being received by companion applications. These events can occur because a companion application subscribes to messaging from the video conference provider. At block 730, the event monitor detects a data event in which shared meeting data includes personal information of one or more of the attendees. Such an event, as an example, may include a client application transmitting a push message during the videoconference to the companion application, where the push message's payload includes the meeting data with personal information relating to some or all of the attendees. As another example, a companion application can receive meeting audio, meeting video, or both. The event monitor forwards the RT event through the system to Web server 614. The Web server acts as a central information hub for process 700. At block 740, the processor running Web server 614 and the processor running meeting server 616 enable the signal indicator to the affected attendees using the interfaces of each participant's client application, for example, one or more of client applications 660*a-c*. In this example, every meeting attendee receives the signal when any one is using an application that accesses personal information. In some examples, all attendees receive the signal.

An interface such as graphical user interface 300 can be used to provide the signal indicator as previously described. In some examples, interaction between the Web server 614 of the video conference provider and an application marketplace server running API service 610 provides event information so that a marketplace server can verify the context of the event. Various Web hooks can be used to determine when and whether to signal an event. Such Web hooks may include, as examples, those that are triggered when a specific attendee joins the videoconference or those that are triggered by use of an app that has access to the videoconferencing client application. Access of the meeting data can be provided to a companion application based on a data type that is used by the companion application and any permission settings for the data type. Such permission settings are generally selected for each user account associated with the companion application.

At block 750 of process 700, an interface such as GUI 400 can optionally provide additional information regarding the data event, based on user input to the relevant client device. At block 760 of process 700, an interface such as GUI 400 can optionally display, based on user input, a list of attendees using the companion application or companion applications. At block 770 of process 700, an interface such as GUI 400 can optionally provide, based on user input, an information document regarding a companion application. This document, as an example, may be a Web page describing the application.

Figure 8:
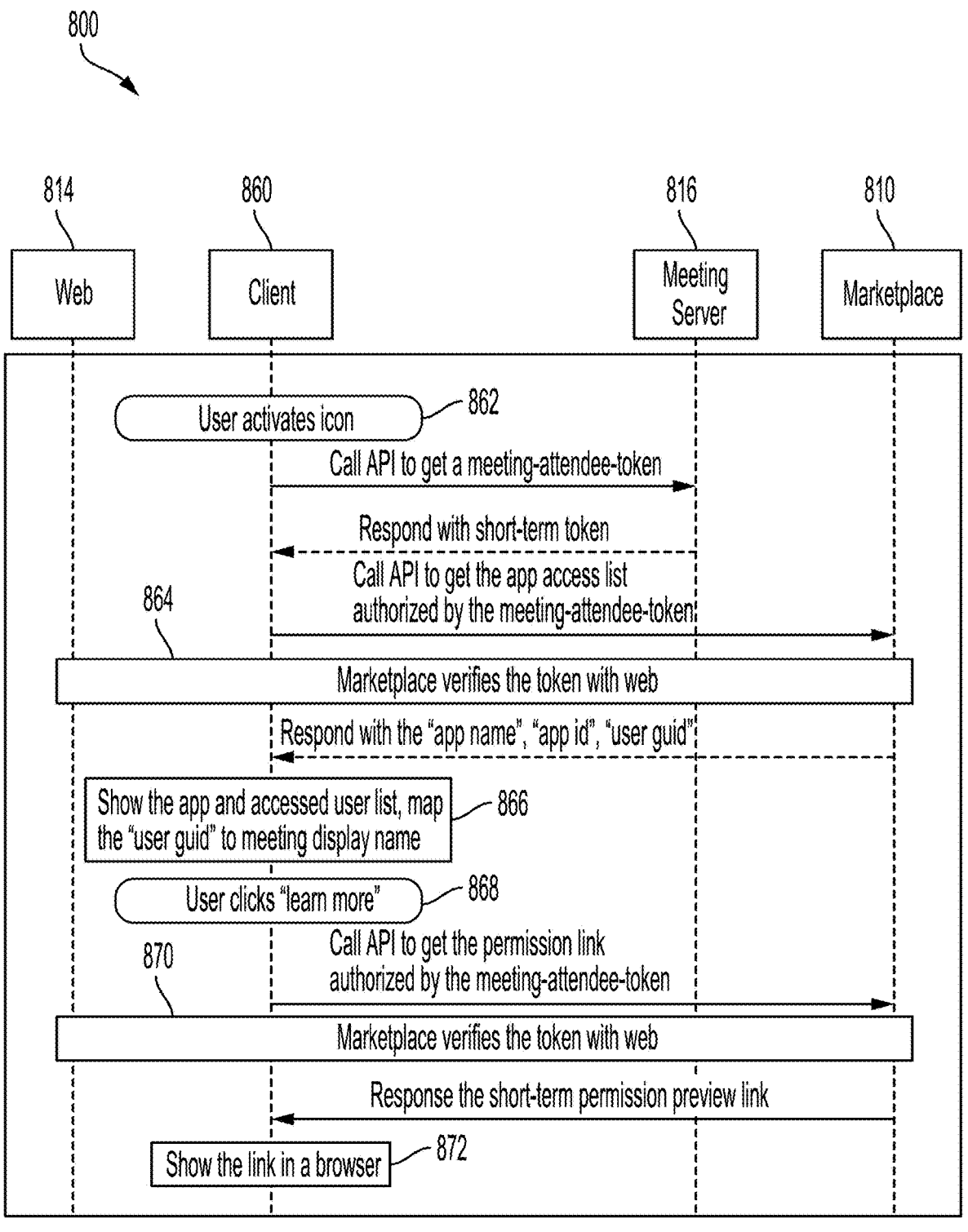
FIG. 8 illustrates an example signal flow for providing user interface details regarding companion applications accessing information about attendees.

FIG. 8 illustrates an example signal flow 800 for providing details regarding companion applications accessing information about attendees of a videoconference. Signal flow 800 describes signaling between a Web entity 814, a client application 860, the meeting server 816, and a marketplace server 810. At block 862, a user of client application 860 selects the indicator icon as previously described in order to gather more information about the indicator signal. For example, a participant using a videoconferencing client application may provide user input to obtain this information as described in block 750, 760 or 770 of FIG. 7. The client application makes an API call to meeting server 816 to get a meeting attendee token. Meeting server 816 responds with the token. Client application 860 then requests an application access list authorized by the meeting attendee token from marketplace server 810. The video conference provider's servers can provide a centralized list of applications that subscribe to its messages so that, at an appropriate time, a subset of the list can be pushed to the videoconference participant.

At block 864, the marketplace server verifies the token with the videoconference provider's Web server, for example, Web server 614 of FIG. 6. Marketplace server 810 then responds with application names, application identifiers, and the user graphical user interface ID (user GUID) for the teleconference. At block 866, the client application 860 displays the application and user lists, mapping the user GUID to the meeting display name used by the videoconferencing system. At block 868, the participant can click or mouse-over the appropriate icon or link to learn more. The marketplace server 810 then receives an API call from client 860 authorized by the meeting attendee token. At block 870, marketplace server 810 verifies the token with the videoconference provider's Web server. Marketplace server 810 can then respond with a short-term permission preview link, which, as an example, can be displayed at block 872 in a browser running on the client device.

Figure 9:
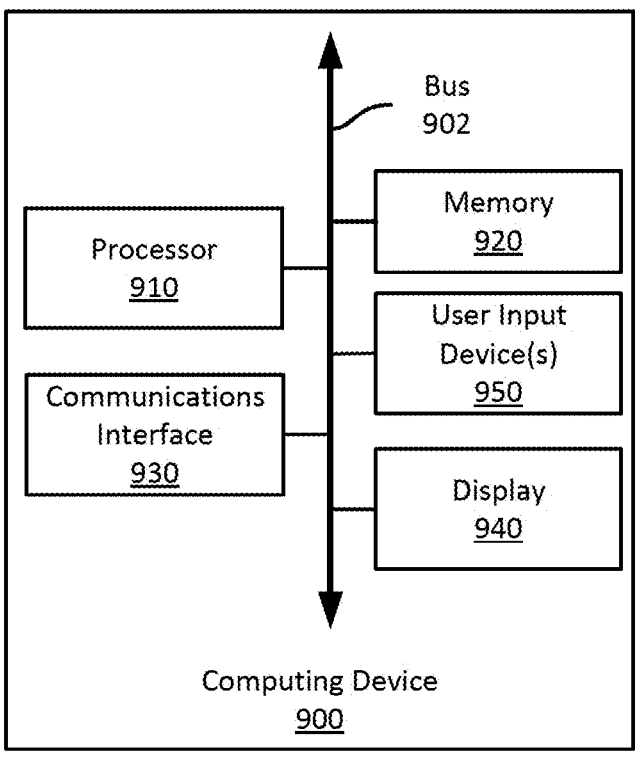
FIG. 9 shows an example computing device suitable for use with any disclosed systems, user interfaces, or methods according to this disclosure.

Referring now to FIG. 9, FIG. 9 shows an example computing device 900 suitable for use in example systems or methods for providing a user interface signal to indicate that a companion application is accessing or has accessed information about attendees a videoconference. The example computing device 900 includes a processor 910 which is in communication with the memory 920 and other components of the computing device 900 using one or more communications buses 902. The processor 910 is configured to execute processor-executable instructions stored in the memory 920 to perform one or more methods for providing an application access signal for participants in videoconferences. The computing device, in this example, also includes one or more user input devices 950, such as a keyboard, mouse, touchscreen, video input device (e.g., one or more cameras), microphone, etc., to accept user input, for example user input directed to obtaining additional information about the user interface signal described herein, such as a list of attendees using the companion application or further information about the companion application. The computing device 900 also includes a display 940 to provide visual output to a user, as examples, the screen displays of FIGS. 3 and 4.

The computing device 900 also includes a communications interface 930. In some examples, the communications interface 930 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A system comprising:
a processor; and
at least one memory device including instructions that are executable by the processor to cause the processor to:
   establish a videoconferencing meeting including a plurality of attendees using a plurality of client devices configured with a videoconferencing application, at least one client device configured to display an indicator corresponding to access by a companion application associated with another participant to personal information about at least one attendee of the plurality of attendees;
   monitor data events in messages from a video conference provider server during the videoconferencing meeting, the messages being pushed to the companion application based on permission settings for a data type selected for a user account associated with the companion application;
   detect a data event among the data events in which meeting data includes the personal information;
   cause the client device to activate the indicator during the videoconferencing meeting in response to the personal information being accessible to the companion application; and
   transmit a meeting attendee token from the video conference provider server to the client device in response to an API call from the client device, the meeting attendee token configured to authorize an app store or marketplace associated with the companion application to transmit an application access list to the client device.

2. The system of claim 1, wherein the instructions are executable to cause the processor to, in response to input to the videoconferencing application, provide additional information about the data event.

3. The system of claim 1, wherein the instructions are executable to cause the processor to, in response to input to the videoconferencing application, provide an informational document for the companion application.

4. The system of claim 1, wherein the companion application is configured to provide collaborative features in association with the videoconferencing application.

5. The system of claim 1, wherein the instructions are executable to cause the processor to provide access to meeting data for the companion application based on scheduling the videoconferencing meeting using the companion application.

6. A method comprising:

establishing a videoconferencing meeting including a plurality of attendees using a plurality of client devices configured with a videoconferencing application, at least one client device configured to display an indicator corresponding to access by a companion application associated with another participant to personal information about at least one attendee of the plurality of attendees;

monitoring data events in messages from a video conference provider server during the videoconferencing meeting, the messages being pushed to the companion application based on permission settings for a data type selected for a user account associated with the companion application;

detecting a data event among the data events in which meeting data includes the personal information;

causing the client device to activate the indicator during the videoconferencing meeting in response to the personal information being accessible to the companion application; and transmitting a meeting attendee token from the video conference provider server to the client device in response to an API call from the client device, the meeting attendee token configured to authorize an app store or marketplace associated with the companion application to transmit an application access list to the client device.

7. The method of claim 6, further comprising, in response to input to the videoconferencing application, providing additional information about the data event.

8. The method of claim 6, further comprising, in response to input to the videoconferencing application, providing an informational document for the companion application.

9. The method of claim 8, wherein the companion application is configured to provide collaborative features in association with the videoconferencing application.

10. The method of claim 6, further comprising providing access to meeting data for the companion application based on scheduling the videoconferencing meeting using the companion application.

11. A non-transitory computer-readable medium comprising code that is executable by a processor for causing the processor to:

establish a videoconferencing meeting including a plurality of attendees using a plurality of client devices configured with a videoconferencing application, at least one client device configured to display an indicator corresponding to access by a companion application associated with another participant to personal information about at least one attendee of the plurality of attendees;

monitor data events in messages from a video conference provider server during the videoconferencing meeting, the messages being pushed to the companion application based on permission settings for a data type selected for a user account associated with the companion application;

detect a data event among the data events in which meeting data includes the personal information;

cause the client device to activate the indicator during the videoconferencing meeting in response to the personal information being accessible to the companion application; and transmit a meeting attendee token from the video conference provider server to the client device in response to an API call from the client device, the meeting attendee token configured to authorize an app store or marketplace associated with the companion application to transmit an application access list to the client device.

12. The non-transitory computer-readable medium of claim 11, wherein the code is executable for causing the processor to, in response to input to the videoconferencing application:

provide additional information about the data event; and provide an informational document for the companion application.

13. The non-transitory computer-readable medium of claim 11, wherein the companion application is configured to provide collaborative features in association with the videoconferencing application.

14. The non-transitory computer-readable medium of claim 11, wherein the code is executable for causing the processor to provide access to meeting data for the companion application based on scheduling the videoconferencing meeting using the companion application.

* * * * *